United States Patent Office 3,420,541
Patented Jan. 7, 1969

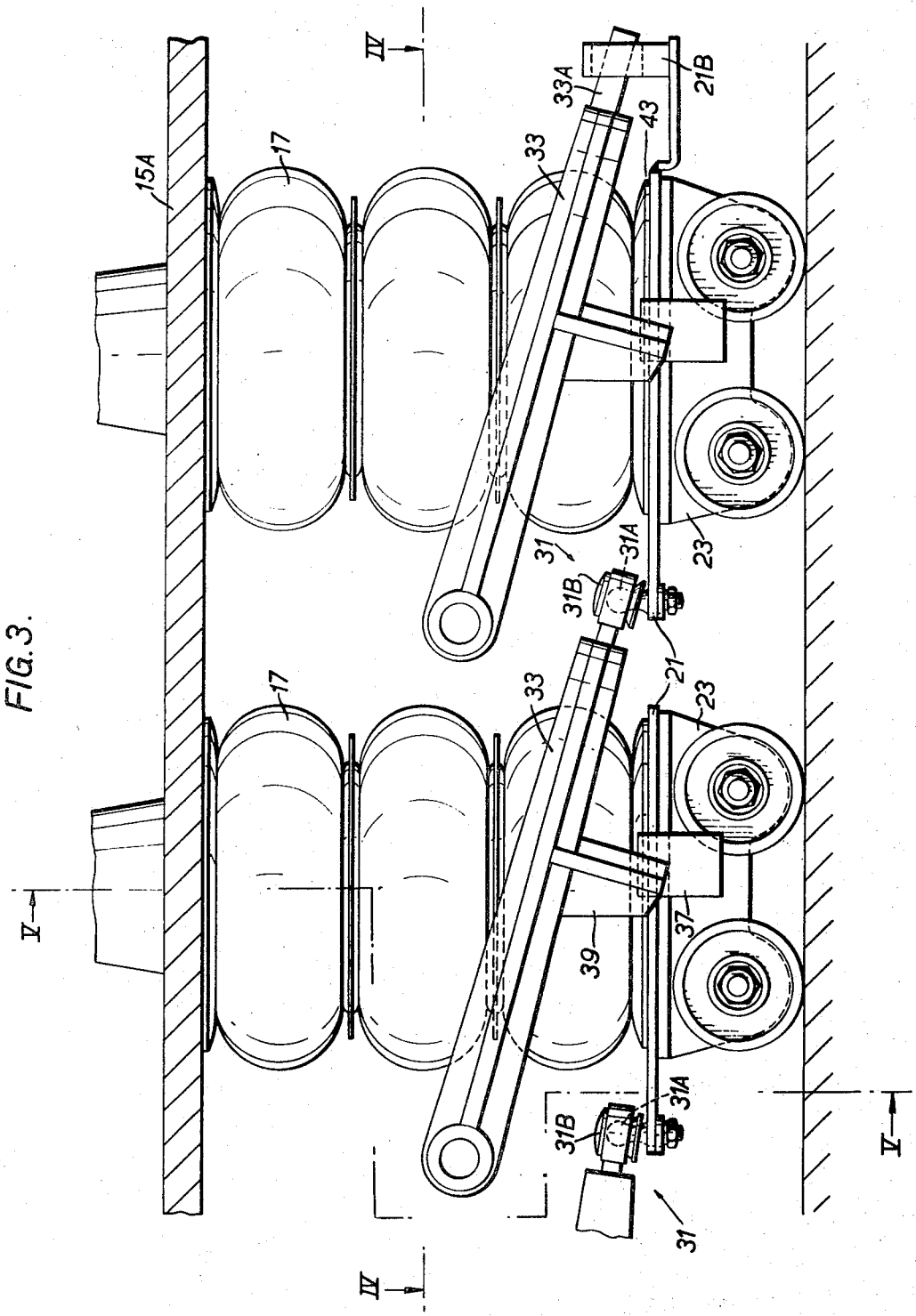

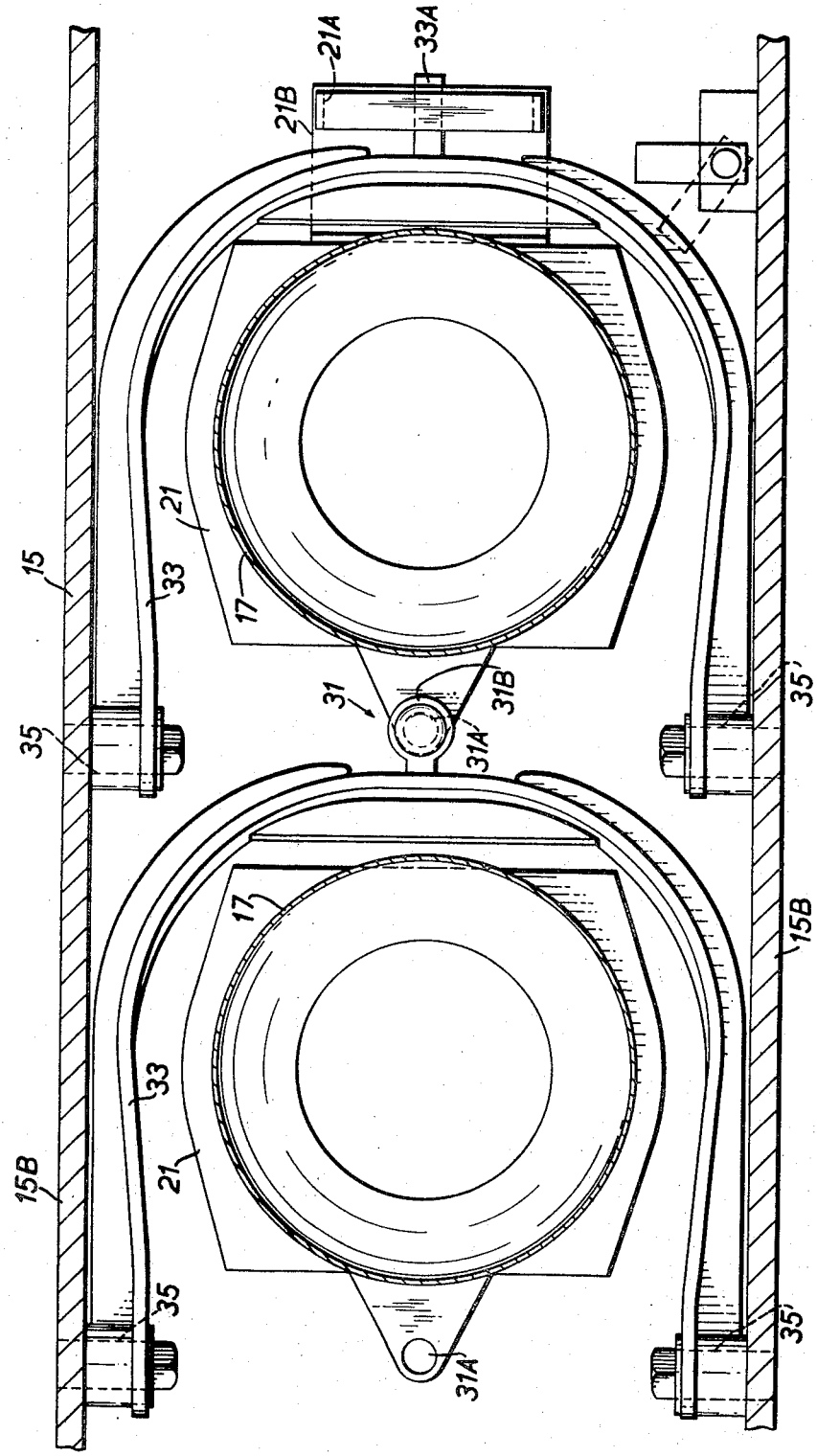

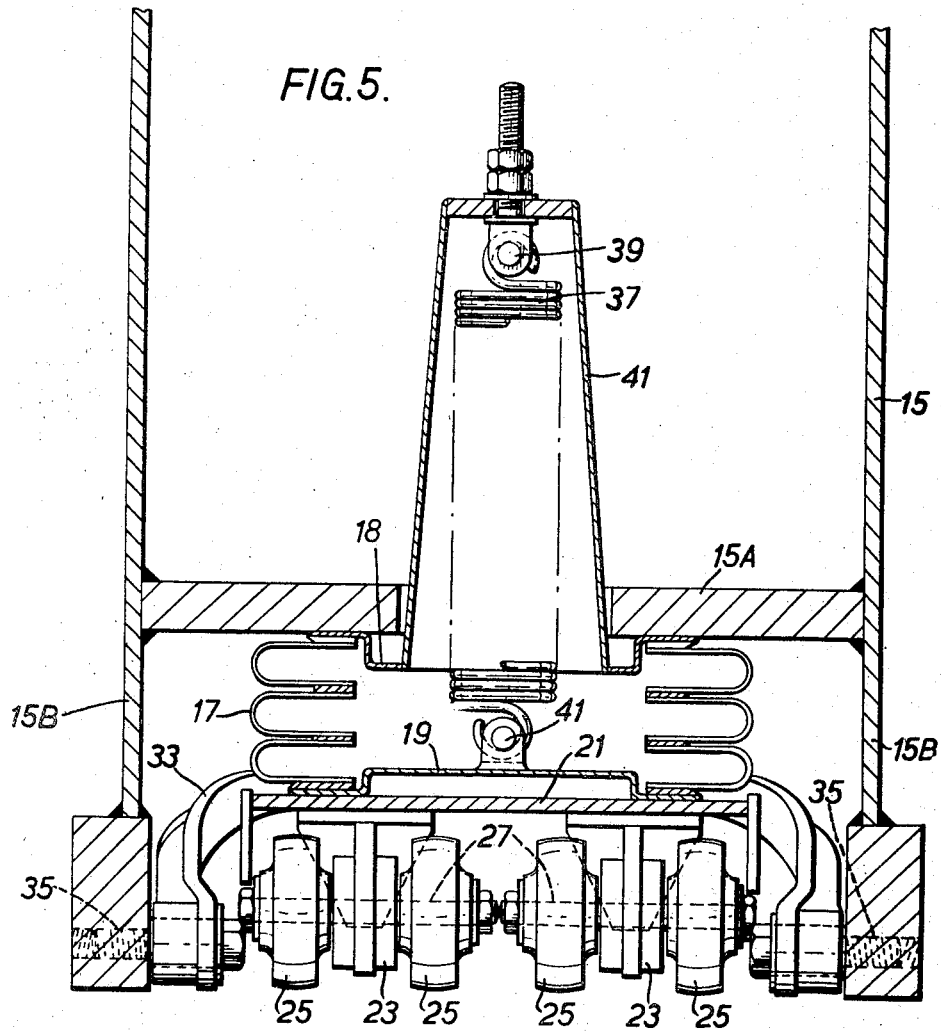

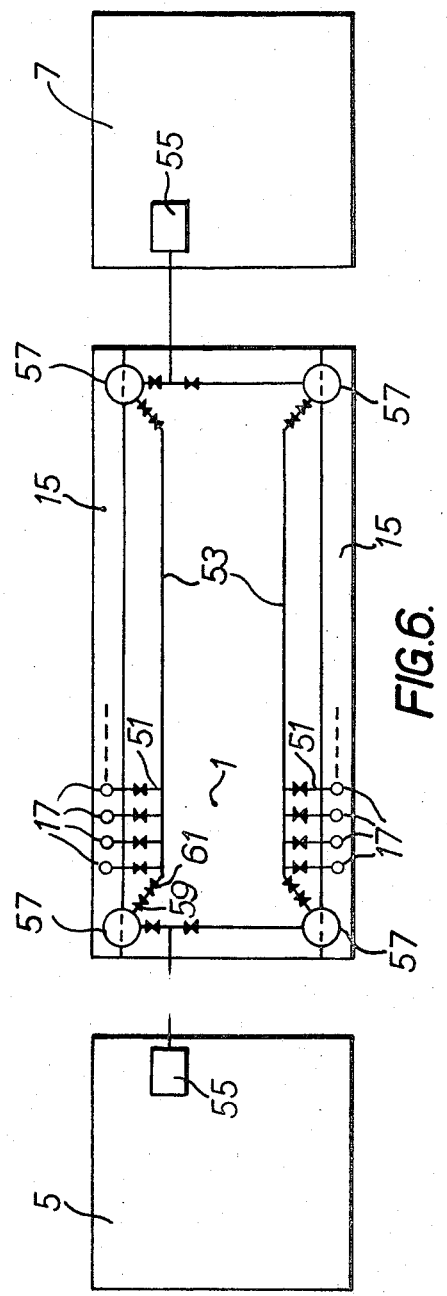

3,420,541
TRANSPORTERS
Cedric Harald Flurscheim, Hale, England, assignor to Associated Electrical Industries Limited, London, England, a British company
Filed Sept. 26, 1966, Ser. No. 581,831
U.S. Cl. 280—43.23
Int. Cl. B62d *61/12;* B62b *1/04;* B62b *3/02*
10 Claims

ABSTRACT OF THE DISCLOSURE

A transporter having, in addition to its main wheels, groups of small auxiliary wheels which can be lowered into operative positions by fluid pressure actuators when it is desired to distribute the transporter load more evenly than the main wheels allow. When lowered, the groups of auxiliary wheels are capable of limited castoring action.

---

This invention relates to transporters, and finds particular application in the transportation of heavy loads over land surfaces, bridges or roads unable to withstand the intensive localised loading produced by orthodox multi-wheeled transporters.

Modern industry is capable of producing very large unitary structures such as fabricated steam boiler drums, electrical generators, electrical transformers and steam turbines. The road and railway systems of this country include many bridges and other sections which are incapable of bearing such masses even when loaded on the large low-level transporters now available, since in all such transporters the load is transmitted to the rail or road surface through a limted number of large road wheels, and the intensity of loading produced at each wheel/road or wheel/rail bearing surface is excessive for the rail, the road or their foundations.

An object of the present invention is the provision of an improved transporter which can be brought into use over road or rail sections where a more distributed loading would permit passage of a desired load.

According to the present invention, a transporter is provided with a plurality of main wheels arranged in normal use to support the body or chassis of the transporter and with a multiplicity of smaller auxiliary wheels movable between a retracted position in which they are inoperative and a lowered position in which they are arranged together to transmit the weight, or a substantial part of the weight, of a load on the transporter to a supporting road, rail or ground surface, these auxiliary wheels being arranged in a multiplicity of groups with the wheels in each group mounted on the lower end of an upright pneumatic or hydraulic unit individual to that group and forming a pressure vessel arranged to support through the auxiliary wheels part of the weight of the load.

The invention will now be described, by way of example, with reference to the accompanying partly diagrammatic drawings in which:

FIGURE 3 is a sectional side elevation taken on the line III—III of FIGURE 2 and as viewed in the direction indicated by the arrows;

FIGURE 4 is a sectional plan view taken on the line IV—IV of FIGURE 3;

FIGURE 5 is a sectional end view taken on the line V—V of FIGURE 3 but with the parts shown in a retracted position; and FIGURE 6 is a schematic representation of air supply means for the transporter.

Figure 1:
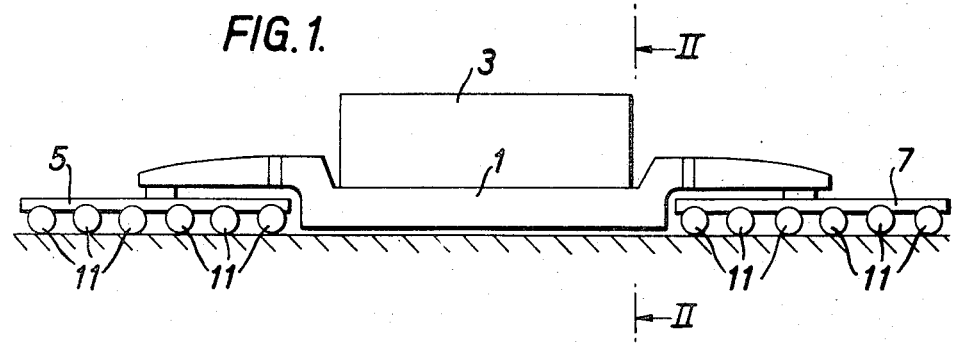
FIGURE 1 is a side elevation of a low-level road transporter to which the invention is applied.
Figure 2:
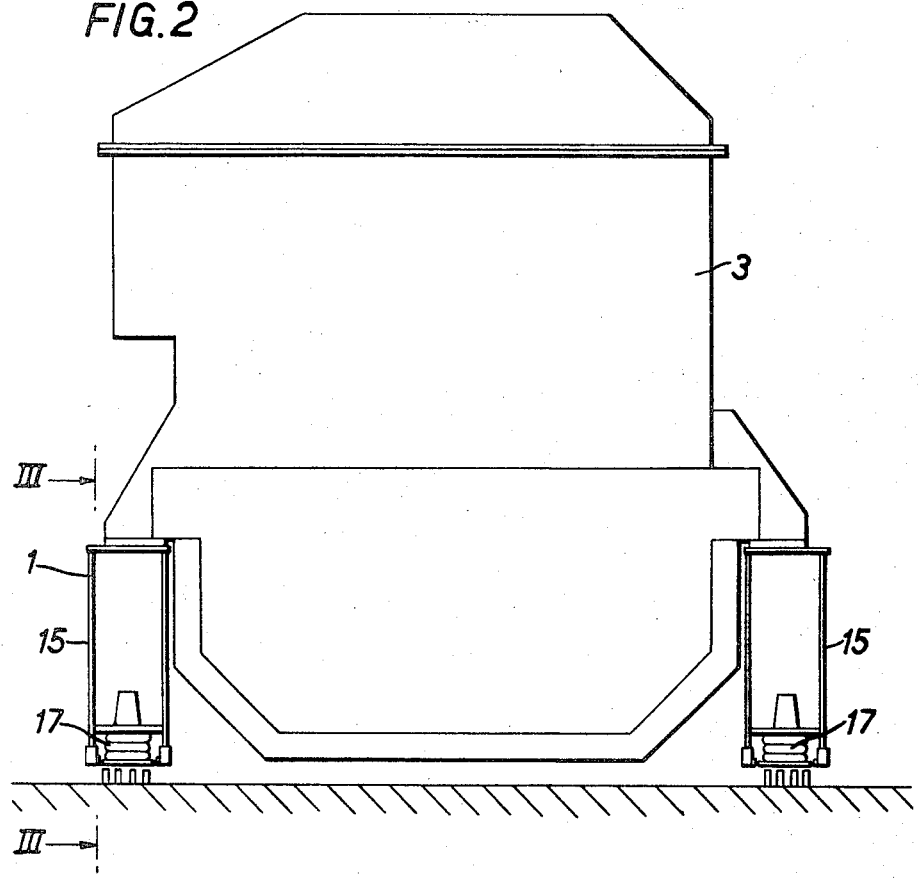
FIGURE 2 is a sectional end view taken on the line II—II of FIGURE 1 and as viewed in the direction indicated by the arrows.

Referring first to FIGURES 1 and 2, the low-level transporter comprises a relatively low platform 1 which is shown carrying a load 3 and at each end a wheeled bogie, namely a front bogie 5 and a rear bogie 7, on which are mounted the main road wheels 11 of the transporter. As is usual in such transporters, suitable steering means are provided by which each bogie can be swivelled to increase the manoeuverability of the transporter. The low platform 1 is built up from two main box girders 15 (see FIGURE 2) extending side by side in spaced relationship and braced by cross girders.

Disposed in each box girder 15 are 27 bellows 17, each arranged with the bellows axis vertical and the bellows being evenly spaced along the length of box girder. Each bellows has its upper end attached (see FIGURES 3 and 5) to the bottom plate 15A of the girder 15 by means of a bellows top plate 18, and its bottom end secured by a bellows bottom plate 19 to a wheel assembly plate 21. Secured to the underside of each plate 21 are two bogies 23 each carrying four wheels 25 on two axles 27. Each axle is carried by its bogie by means of a rubber bush which enables a small amount of axle tilt to be accommodated, and each wheel is of four inches diameter and is tyred with a polyurethane rubber. With an air pressure of 45 pounds per square inch in each bellows, each bellows can support 3320 pounds, giving a total supporting force of 80 tons.

Each wheel assembly plate is given a castoring action by means of a ball joint 31 (see FIGURE 3) consisting of a stud-mounted ball 31A secured to the upper surface of the plate 21 and a socket 31B mounted on a wishbone member 33. The ball 31A is positioned about 8 inches in front of the vertical through the bellows, and the wishbone member 33 extends about the sides of the next bellows towards the front of the transporter, and is mounted on pivot pins 35 secured to the side walls 15B of the box girder at about the midheight of the bellows and about 25 inches in front of the vertical through the bellows associated with the plate 21 to which it is coupled. It will be seen that the ball socket 31B (and thus the ball 31A) is unable to move laterally of the box girder but is able to rise and fall along an arcuate path, while the plate 21 is able to tilt in a fore-and aft direction, is able to tilt in a lateral direction, and is able to swing sidewardly about the ball socket 31B to provide the castoring action. Stops 37 mounted on the base plate 21 and stops 39 mounted on the wishbone member 33 engage one another to limit the sideward swing of the plate 21 to 7½ degrees to right or left of the straight-ahead central position. As shown in FIGURE 4, the rearmost bellows 17 of a group of bellows is partially surrounded by an extra wishbone member 33 which is provided with a peg 33A lying within a slot 21A in a bracket 21B carried by the rearmost plate 21, and effective to cause this wishbone to partake in vertical movement of this bellows. This extra wishbone member is necessary to limit the sideward swing of plate 21 of this rearmost bellows.

The wheels 25 can be retracted to a position within the box girder 15, as shown in FIGURE 5, when the transporter is in normal use with the load carried by the road wheels 11.

Upon release of the air pressure in the bellows, the retraction of the plate 21 and the parts carried thereby is effected by means of a tension spring 37 acting between an adjustable pin 39 carried by an airtight enclosure 41 secured to the bellows top plate 18, and a pin 41 mounted on bellows bottom plate 19. A mechanical latch (not shown) is also provided carried by the box girder 15 and arranged to hold the parts in their retracted positions and to prevent downward movement should the associated spring 37 break while the transporter is running normally on its main road wheels.

An air connection 51 to the interior of each bellows is carried by the box girder 15, and these air connections communicate with a manifold 53 mounted on the box girder. Compressed air is provided by two diesel engine driven compressors 55 of the reciprocating type mounted one one each of the two main bogies of the vehicle. These compressors pump air at a pressure of about 110 pounds per square inch into a reservoir system comprising four reservoirs 57 mounted respectively at the four ends of girders 15. From these reservoirs the air can pass through cocks 59 to two manually preset pressure reducing valves 61, one for each girder, and these supply to the manifolds and thus to the bellows air at an accrately regulated pressure. These reducing valves are of the type which, by feeding or spilling air, hold the bellows pressure constant both during expansion of the bellows (when the road surface tends to fall away from the bellows wheels 25) and during contraction of the bellows (when the road surface tends to rise). By the provision of two reducing valves, one for each girder, different loads can be supported by the two girders by presetting these two valves to different pressure settings.

The compressed air system incorporates safety valves and pipe line filters, and the air pipe system is sectionalised by the provision of cocks so that a section containing an air leak can be isolated to permit normal operation of the remainder of the bellows.

By the provision of the castoring action for the wheel plates, side scrub on the small wheels while they are in use is considerably reduced.

In use of the transporter, during normal travel over made roads the springs 37 on conjunction with the mechanical latch maintain the bellows in their collapsed state, the pair pressure therein being substantially atmospheric, and the wheels 25 are clear of the ground. The full weight of the load 3 and the transporter is carried by the main rod wheels 11.

When a bridge unable to accept the loading of these road wheels is encountered, or ground is to be traversed which is unable to accept this loading, the latches retaining the plates 21 are pleased and air under pressure is admitted to the bellows 17. When the wheels 25 bear on the road surface, they reduce considerably the pressure on the road wheels 11. The pressure used in the bellows will determine the fraction of the total weight of the load and the transporter which is carried by the wheels 25. In many cases the pressure used in the bellows will be such that a major part of the total weight will be carried by the road wheels 11.

When the transporter moves onto the bridge or ground it is required to traverse, firstly the total load is distributed over a part of the bridge or road of greater length than the sum of the wheel bases of the two bogies, and secondly the load is much more uniformly distributed. As a result, the transporter can be moved over many bridges which could not accept the load 3 as a point load or the normal loadings on the wheels 11 as point loadings. On a relatively soft road, the point loadings on the wheels 11 and 25 will usually be low enough to be acceptable, but otherwise thin metal sheets placed on the road surface will distribute the load even more uniformly to permit the transporter to move over the road.

The bellows form upright pneumatic units each individual to a group of the wheels 25, and if desired can be replaced with an arrangement of hydraulic struts forming upright hydraulic units each individual to a group of wheels 25.

Although the bellows are described as using air as their working fluid, a hydrauic fluid could be used in its place so that the bellows would serve as upright hydraulic units.

What I claim is:
1. A transporter comprising:
 (a) a platform adapted to carry a load to be transported;
 (b) a plurality of main wheels adapted normally to support the platform;
 (c) a multiplicity of auxiliary wheels of smaller diameter than the main wheels and arranged in groups, each group comprising a plurality of auxiliary wheels;
 (d) a multiplicity of upright fluid pressure actuator units each mounted at its upper end on the platform and each having a said group of the auxiliary wheels mounted on its lower end;
 (e) means for supplying fluid under pressure to the actuator units to extend the respective groups of auxiliary wheels from retracted positions to lowered positions in which the auxiliary wheels are operative to support at least a substantial part of the weight of the transporter platform;
 (f) interconnecting means for interconnecting the lower ends of the actuator units and the platform, said interconecting means including swivable anchorage means for permitting castoring movement of the respective groups of auxiliary wheels, and
 (g) stop means limiting said castoring movement of said groups of auxiliary wheels.

2. A transporter according to claim 1 including spring means urging the lower end of each fluid pressure actuator unit upwardly, biassing the respective group of auxiliary wheels towards its retracted position.

3. A transporter according to claim 1, in which:
 (a) the underside of the platform is provided with a plurality of recesses;
 (b) the upper ends of at least some of the fluid pressure actuator units are mounted in one of the recesses, the respective auxiliary wheels when retracted also lying within said recesses.

4. A transporter according to claim 1, in which:
 (a) a first group of the fluid pressure actuator units is disposed along a first side of the transporter platform;
 (b) a second group of the fluid pressure actuator units is disposed along a second side of the transporter platform;
 (c) a first supply system is arranged to supply fluid under pressure to the first group of actuator units;
 (d) a second supply system is arranged to supply fluid under pressure to the second group of actuator units, and,
 (e) valve means are connected to said first and second supply systems to control the fluid pressure therein independently.

5. A transporter according to claim 1, in which the fluid pressure actuator units comprise respective hydraulic units.

6. A transporter according to claim 1, in which:
 (a) the fluid pressure actuator units comprise respective pneumatic bellows;
 (b) a base member is attached to the lower end of each bellows;
 (c) the auxiliary wheels are carried by said base member, and
 (d) each swivel anchorage means comprises a respective universal joint anchoring the leading side of the respective base member against lateral movement and permitting lateral and fore-and-aft tilting of the base member about said joint.

7. A transporter according to claim 6, in which:
 (a) each universal joint comprises a first part and a second part, the first part being mounted on the respective base member;
 (b) a mechanical link is pivotally mounted on the platform, the second part of the universal joint being carried by said mechanical link, and
 (c) the pivotal axis of the mechanical link is disposed in front of the universal joint, permitting vertical movement of the universal joint along a curved path of sufficiently large radius to avoid damage to the bellows.

8. A transporter according to claim 7, in which:

(a) the mechanical link is in the form of a generally U-shaped structure having a base and two arms;
(b) the second part of the universal joint is mounted on the base of the U-shaped structure, and
(c) bearings are provided at the free ends of each arm of the link and are connected to the platform to define a horizontal pivotal axis, whereby the second part of the universal joint has freedom of vertical movement but is prevented from moving laterally of the transporter.

9. A transporter according to claim 8, in which:
(a) the two arms of the U-shaped link extend respectively on opposite sides of that one of the bellows which is disposed in front of the respective universal joint carried by said link, and
(b) the said stop means comprise abutments provided on the two arms of the U-shaped link, said abutments limiting the lateral movement of the said one of the bellows.

10. A transporter according to claim 6, in which:

(a) the bellows are arranged in groups, the bellows of each group being disposed one behind the other;
(b) a mechanical link is pivotally mounted on the platform at the rearmost end of each group;
(c) the pivotal axis of said link is disposed in front of the rearmost bellows in the group, and
(d) a rearmost end of said link is connected to the trailing end of the base member of that rearmost bellows, said link being effective by the connection at its rearmost end to check excessive lateral movement of the trailing end of the base member.

UNITED STATES PATENTS

References Cited

3,147,024    9/1964    Brockman _____ 280—81
3,285,621    11/1966    Turner _____ 280—43.23

BENJAMIN HERSH, *Primary Examiner.*

R. SONG, *Assistant Examiner.*